United States Patent
Tang

(10) Patent No.: US 10,902,036 B2
(45) Date of Patent: Jan. 26, 2021

(54) INTERSECTION ALGORITHM-BASED SEARCH METHOD AND SYSTEM, AND STORAGE MEDIUM

(71) Applicant: TENCENT TECHNOLOGY (SHENZHEN) COMPANY LIMITED, Shenzhen (CN)

(72) Inventor: Shanmin Tang, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 982 days.

(21) Appl. No.: 15/465,155

(22) Filed: Mar. 21, 2017

(65) Prior Publication Data
US 2017/0193081 A1    Jul. 6, 2017

Related U.S. Application Data

(63) Continuation of application No. PCT/CN2016/077978, filed on Mar. 31, 2016.

(30) Foreign Application Priority Data

Apr. 28, 2015 (CN) .......................... 2015 1 0207879

(51) Int. Cl.
G06F 7/00 (2006.01)
G06F 16/31 (2019.01)
(Continued)

(52) U.S. Cl.
CPC ........ *G06F 16/322* (2019.01); *G06F 16/3334* (2019.01); *G06F 16/3344* (2019.01); *G06F 16/93* (2019.01); *G06F 40/211* (2020.01)

(58) Field of Classification Search
CPC ..... G06F 16/322; G06F 16/93; G06F 16/3334
See application file for complete search history.

(56) References Cited

U.S. PATENT DOCUMENTS 4,823,306 A * 4/1989 Barbic ................ G06F 16/3338
5,828,848 A * 10/1998 MacCormack .. G08B 13/19604
                                                        709/247
(Continued)

FOREIGN PATENT DOCUMENTS

CN    101071442 A    11/2007
CN    101206672 A    6/2008
(Continued)

OTHER PUBLICATIONS

The World Intellectual Property Organization (WIPO) International Search Report for PCT/CN2016/077978 dated Jun. 29, 2016 6 Pages.

(Continued)

*Primary Examiner* — Eliyah S. Harper
(74) *Attorney, Agent, or Firm* — Anova Law Group, PLLC

(57) ABSTRACT

The present disclosure provides an, intersection algorithm-based search method and system, and a storage medium, where the search method includes: analyzing search keywords to generate a syntax tree; flattening the syntax tree and selecting a document set having a shortest inverted block as a minimum candidate set; traversing the minimum candidate set and evaluating a traversing result to separately generate a quantity of times of inverted intersections and a quantity of times of sequential intersections; and selecting an intersection algorithm having the less quantity of times as a target intersection algorithm and generating a search result according to the target intersection algorithm.

20 Claims, 6 Drawing Sheets

(51) Int. Cl.
*G06F 16/93* (2019.01)
*G06F 16/33* (2019.01)
*G06F 40/211* (2020.01)

(56) References Cited

U.S. PATENT DOCUMENTS

| | | | | |
|---|---|---|---|---|
| 5,884,042 | A * | 3/1999 | Winter | G08B 13/19604 |
| | | | | 709/231 |
| 5,893,094 | A * | 4/1999 | Horowitz | G06F 16/316 |
| 5,917,958 | A * | 6/1999 | Nunally | G08B 13/19604 |
| | | | | 382/276 |
| 10,452,692 | B2 * | 10/2019 | Wang | G06F 16/319 |
| 2009/0049035 | A1 * | 2/2009 | He | G06F 16/951 |
| 2010/0042603 | A1 * | 2/2010 | Smyros | G06F 16/338 |
| | | | | 707/711 |
| 2011/0087684 | A1 * | 4/2011 | Junqueira | G06F 16/24532 |
| | | | | 707/764 |
| 2013/0004090 | A1 * | 1/2013 | Kundu | G06Q 20/20 |
| | | | | 382/232 |
| 2015/0220529 | A1 * | 8/2015 | Eltabakh | G06F 16/182 |
| | | | | 707/719 |

FOREIGN PATENT DOCUMENTS

| | | |
|---|---|---|
| CN | 102136011 A | 7/2011 |
| CN | 102156712 A | 8/2011 |

OTHER PUBLICATIONS

Jiang, Juan, Research and Realization of Vertical Search Engine Data Analyzing Technique, Electronic Technology & Information Science, China Master's Theses Full-Text Database, Feb. 15, 2009.

\* cited by examiner

INTERSECTION ALGORITHM-BASED SEARCH METHOD AND SYSTEM, AND STORAGE MEDIUM

CROSS-REFERENCES TO RELATED APPLICATION

This application is a continuation application of PCT Patent Application No. PCT/CN2016/077978, filed on Mar. 31, 2016, which claims priority to Chinese Patent Application No. 201510207879.1, entitled "INTERSECTION ALGORITHM-BASED SEARCH METHOD AND SYSTEM, AND STORAGE, MEDIUM", filed on Apr. 28, 2015, the entire contents of both of which are incorporated herein by reference.

FIELD OF THE TECHNOLOGY

The present disclosure belongs to the field of data retrieval, and in particular, to an intersection algorithm-based search method and system, and a storage medium

BACKGROUND OF THE DISCLOSURE

Briefly, real time search is to perform instant and rapid search on some information on the internet to implement a search-and-get effect. Generally, an existing technical solution of the real time search only supports inverted intersection, that is, based on a document set corresponding to each keyword.

During a process of establishing a real time search index, a 32-bit integer number is allocated to each document as a unique identifier. A B+ inverted format is used for each word to store the document identifiers, and documents inside the inversion are arranged in ascending order according to the document identifiers. For example, a document DOC1 includes keywords (A, B, and D), a document DOC2 includes keywords (B and C), a document DOC3 includes keywords (C and D), and a document DOC4 includes keywords (A, B, and C). An established inverted structure is shown in FIG. 1. In this case, when a retrieval string "AB" is initiated, inverted intersection can be completed only by taking inversion of A and B and using a binary search method to find a same document set in A or B. Finally, a result "DOC1, DOC4" is obtained.

There are relatively more high-frequency word documents and relatively longer inverted formats, and low-frequency documents are less but are discretely distributed. Therefore, when intersection is performed on a low-frequency word and a high-frequency word, basically, it needs to determine all inverted blocks of the high-frequency word to obtain a same set. For example, if the high-frequency word has N inverted blocks and the low-frequency word has only in documents (distributed in several inverted blocks of the high-frequency word), intersection needs to be performed on the low-frequency word and the high-frequency word for 2N times to determine and obtain inverted blocks hitting a range, and log (a quantity of documents in the inverted block) times of comparison is performed inside each inverted block so as to determine whether a document is hit. A longer high-frequency word indicates more time consumed by the retrieval.

Therefore, in the existing technical solution of the real time search, inversion is performed on the high-frequency word, and at the same time, a bit map storage format is used, which can improve retrieval efficiency, but occupies much memory, and is hard to be extended and flexibly used.

SUMMARY

In view of the above, an objective of the present disclosure is to provide an intersection algorithm-based search method and system, so as to resolve technical problems of memory consumption, extension difficulties, and time consumption in the existing technology.

In order to resolve the foregoing technical problems, an embodiment of the present disclosure provides an intersection algorithm-based search method, including: analyzing search keywords to generate a syntax tree; flattening the syntax tree and selecting a document set having a shortest inverted block as a minimum candidate set; traversing the minimum candidate set and evaluating a traversing result to separately generate a quantity of times of inverted intersections and a quantity of times of sequential intersections; comparing the quantity of times of inverted intersections with the quantity of times of sequential intersections and selecting an intersection algorithm having the less quantity of times as a target intersection algorithm, wherein the intersection algorithm is selected from a first algorithm corresponding to the inverted intersections and a second algorithm corresponding to the sequential intersections; and generating a search result according to the target intersection algorithm.

In order to resolve the foregoing technical problems, an embodiment of the present disclosure provides an intersection algorithm-based search system, including: a syntax tree generation module, configured to analyze search keywords to generate a syntax tree; a minimum candidate set selection module, configured to flatten the syntax tree and select a document set having a shortest inverted block as a minimum candidate set; a quantity of times estimation module, configured, to traverse the minimum candidate set and evaluate a traversing result to separately generate a quantity of times of inverted intersections and a quantity of times of sequential intersections; a target intersection algorithm selection module, configured to compare the quantity of times of inverted intersections with the quantity of times of sequential intersections and select an intersection algorithm having the less quantity of times as a target intersection algorithm, wherein the intersection algorithm is selected from a first algorithm corresponding to the inverted intersections and a second algorithm corresponding to the sequential intersections; and a search module, configured to generate a search result according to the target intersection algorithm.

In order to resolve the foregoing technical problems, an embodiment of the present disclosure provides a non-transitory storage medium, storing a processor executable instruction therein, the processor executable instruction being configured to enable a processor to complete the following operations; analyzing search keywords to generate a syntax tree; flattening the syntax tree and selecting a document set having a shortest inverted block as a minimum candidate set; traversing the minimum candidate set and evaluating a traversing result so as to separately generate a quantity of times of inverted intersections and a quantity of times of sequential intersections; comparing the quantity of times of inverted intersections with the quantity of times of sequential intersections and selecting an intersection algorithm having the less quantity of times as a target intersection algorithm, wherein the intersection algorithm is selected from a first algorithm corresponding to the inverted intersections and a second algorithm corresponding to the sequential intersections; and generating a search result according to the target intersection algorithm.

As compared with the existing technology, the intersection algorithm-based search method and system, and the storage medium in the present disclosure evaluate inverted intersection and sequential intersection to select a target intersection algorithm used for search, and can achieve small memory occupation, easy extension, and a rapid and in-time search response.

DESCRIPTION OF EMBODIMENTS

Referring to figures in the accompanying drawings, a same component symbol represents a same component, and a principle of the present disclosure is illustrated by means of implementation in an appropriate operation environment. The following description is based on exemplary embodiments of the present invention, and shall not be considered as other embodiments that are not described in detail herein and limit the present disclosure.

The principle of the present disclosure is described above, and does not represent a limitation. A tester in the art will know that the following multiple kinds of steps and operations may also be implemented in hardware. According to the principle of the present disclosure, operation is performed by using a lot of computations, communication environments or configurations for other general or specific purposes.

Figure 1:
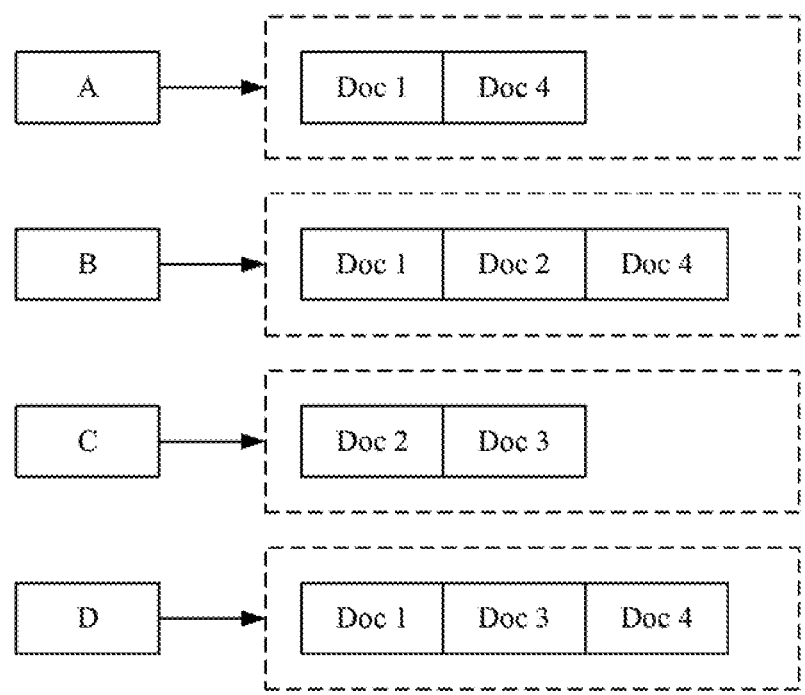
FIG. 1 is a schematic structural diagram of inverted intersection according to the background of the present disclosure.
Figure 2:
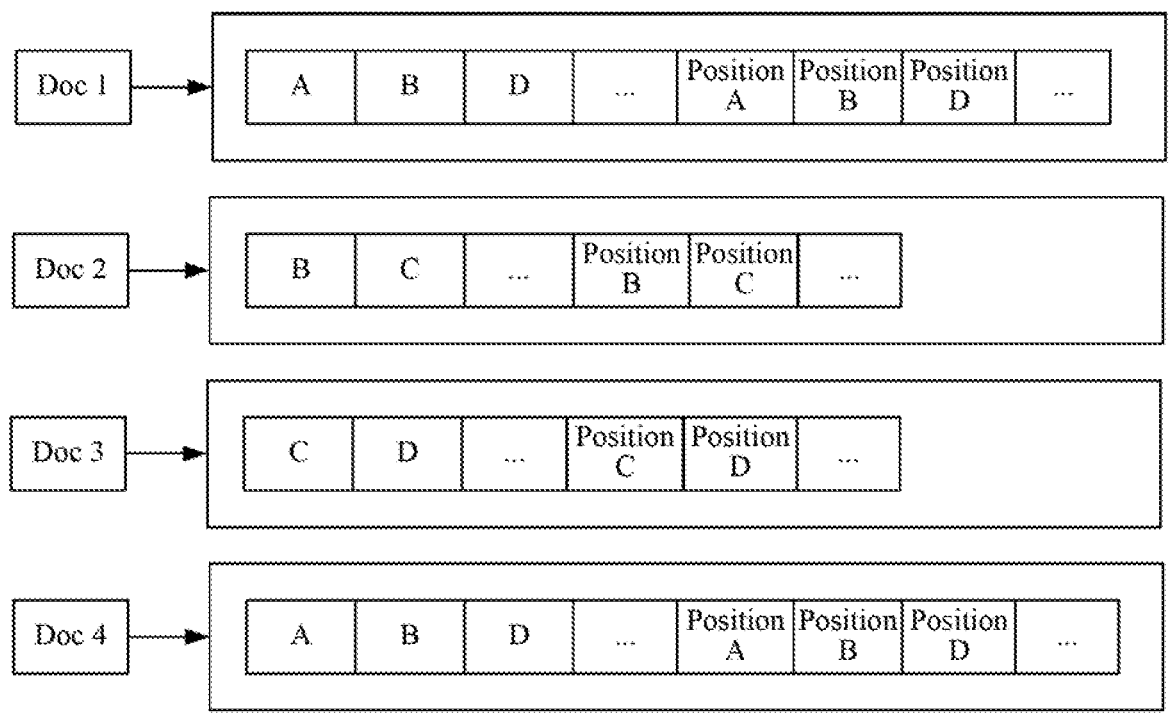
FIG. 2 is a schematic structural diagram of sequential intersection according to an embodiment of the present disclosure.

Referring to FIG. 1 and FIG. 2. FIG. 1 and FIG. 2 are respectively a schematic structural diagram of inverted intersection and a schematic structural diagram of sequential intersection.

Inverted intersection and sequential intersection are comparatively presented by using an embodiment below. It can be understood that the embodiment shall not be considered as a limitation to the present disclosure. Assume that there are four documents in total: DOC1, DOC2, DOC3, and DOC4, respectively, and four keywords for search: A, B, C, and D, respectively, in candidate sets.

Referring to the structure of the inverted intersection shown in FIG. 1, the structure presents the keywords A, B, C, and D and sets of the documents DOC1, DOC2, DOC3, and DOC4 corresponding to the keywords.

Referring to the structure of the sequential intersection according to the present disclosure shown in FIG. 2, the structure presents sets of the keywords A, B, C, and corresponding to the documents DOC1, DOC2, DOC3, and DOC4. In other words, the sequential indexing records a list of keywords for each document. The sequential indexing may also be referred as forward index.

The intersection algorithm-based search method and system provided in the present disclosure aims at evaluating the foregoing inverted intersection and sequential intersection, so as to select a target intersection algorithm used for search. The intersection algorithm-based search method and system can be applied to products that implement real-time search, and can achieve small memory occupation, easy extension, and a rapid and in-time search response.

Referring to the following embodiments, Embodiment 1 focuses on basic steps of the intersection algorithm-based search method; Embodiment 2 focuses on optimized steps of the intersection algorithm-based search method; Embodiment 3 focuses on basic modules of the intersection algorithm-based search system; Embodiment 4 focuses on optimized modules of the intersection algorithm-based search system, and Embodiment 5 focuses on a server. It can be understood that although focuses of the embodiments are different, design concepts of the embodiments are consistent. Moreover, for parts that are not described in detail in a particular embodiment, refer to detailed descriptions in the full text of the description, and details are not described herein again.

Embodiment 1

Figure 3:
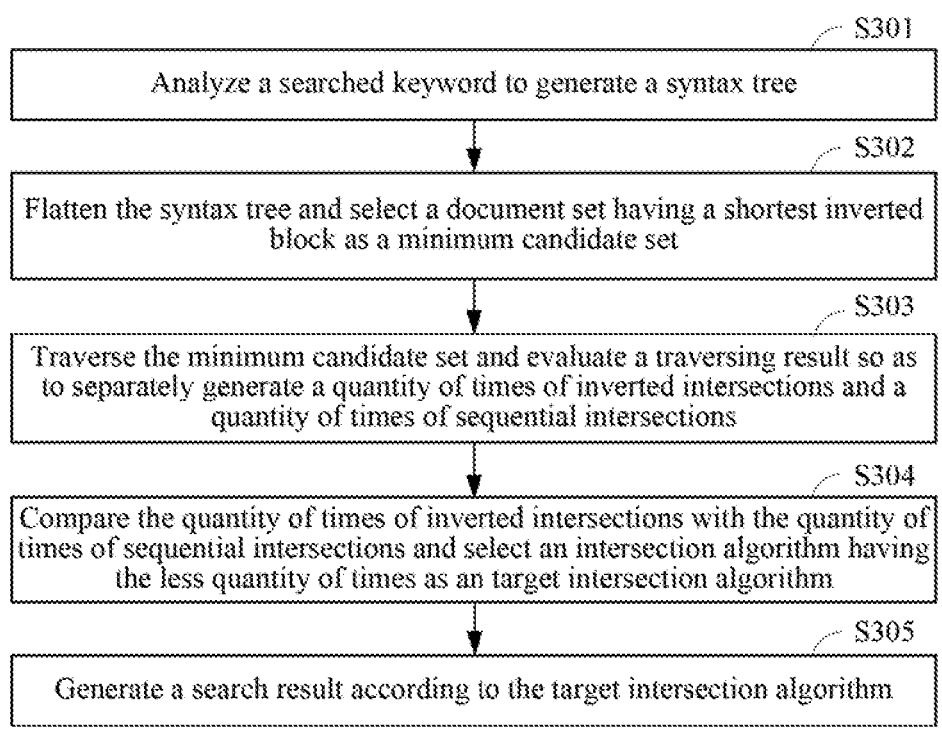
FIG. 3 is a schematic diagram of a work process of an intersection algorithm-based search method according to Embodiment 1 of the present disclosure.

Referring to FIG. 3, FIG. 3 is a schematic diagram of a work process of an intersection algorithm-based search method. This embodiment, mainly illustrates basic steps of the intersection algorithm-based search method, applied to a server, the search method including:

In step S301, the server analyzes a search keyword to generate a syntax tree.

The step of generating the syntax tree specifically includes: (1) presetting an analysis rule, the analysis rule including at least one of word meaning analysis or semantic analysis; (2) analysing the search keywords according to the analysis rule; and (3) generating an analyzed keyword set into a syntax tree.

In step S302, the server flattens the syntax tree and selects a document set having a shortest inverted block as a minimum candidate set. As used herein, an inverted block may refer to a data block that stores inverted indexes. As used herein, a document set having a shortest inverted block may refer to a document set having least number of inverted indexes or least number of data blocks that stores the inverted indexes.

The step of flattening and selecting the minimum candidate set specifically includes: (1) flattening the syntax tree to form primary candidate sets; (2) sorting the primary candidate sets according to lengths of the inverted blocks, where the length of the inverted block may be understood as a quantity of documents (e.g., containing the keyword); and (3) selecting a document set having a shortest inverted block as a minimum candidate set.

In step S103, the server traverses the minimum candidate set and evaluates a traversing result to respectively generate a quantity of times of inverted intersections and a quantity of times of sequential intersections. As used herein, evaluating a quantity of times of inverted intersections may refer to evaluating a number of comparisons the search engine makes to complete the intersection operations of inverted indexes for generating the search result. For example, one inverted intersection operation is between the minimum candidate set and a remaining primary set by performing comparisons with a binary search to find all documents that exist in both document sets. As used herein, evaluating a quantity of times of sequential intersections may refer to evaluating a number of comparisons the search engine makes to complete the intersection operations of forward indexes for generating the search result. For example, one sequential intersection operation is between the minimum candidate set and a remaining primary set by performing comparisons with a binary search to find all documents of the minimum candidate set that includes the keyword(s) associated with the remaining primary set.

The quantity of times of sequential intersections is calculated by using a quantity of keywords, a quantity of documents of the minimum candidate set, and an average quantity of keywords in each document.

The quantity of times of inverted intersections is calculated by using a quantity of keywords, a quantity of inverted blocks, and a quantity of documents in the inverted blocks.

In step S304, the server compares the quantity of times of inverted intersections with the quantity of times of sequential intersections and selects an intersection algorithm having the less quantity of times as a target intersection algorithm.

The step of selecting the target intersection algorithm specifically includes: (1) comparing the quantity of times of inverted intersections with the quantity, of times of sequential intersections; (2) if the quantity of times of inverted intersections is less than the quantity of times of sequential intersections, selecting the quantity of times of inverted intersections as the target intersection algorithm; and (3) if the quantity of times of inverted intersections is greater than or equal to the quantity of times of sequential intersections, selecting the quantity of times of sequential intersections as the target intersection algorithm.

It can be understood that, upon comparison, if the quantity of times of inverted intersections is equal to the quantity of times of sequential intersections, the sequential intersection is preferably used by default. Such default setting allow that the sequential intersection occupies less memory in a search process.

By evaluating the inverted intersection, and the sequential intersection to select a target intersection algorithm used for search, a search response speed can be effectively improved.

In step S305, the server generates a search result according to the target intersection algorithm.

The intersection algorithm-based search method in the present disclosure is to evaluate inverted intersection and sequential intersection to select a target intersection algorithm used for search, and can achieve small memory occupation, easy extension, and a rapid and in-time search response.

Embodiment 2

Figure 4:
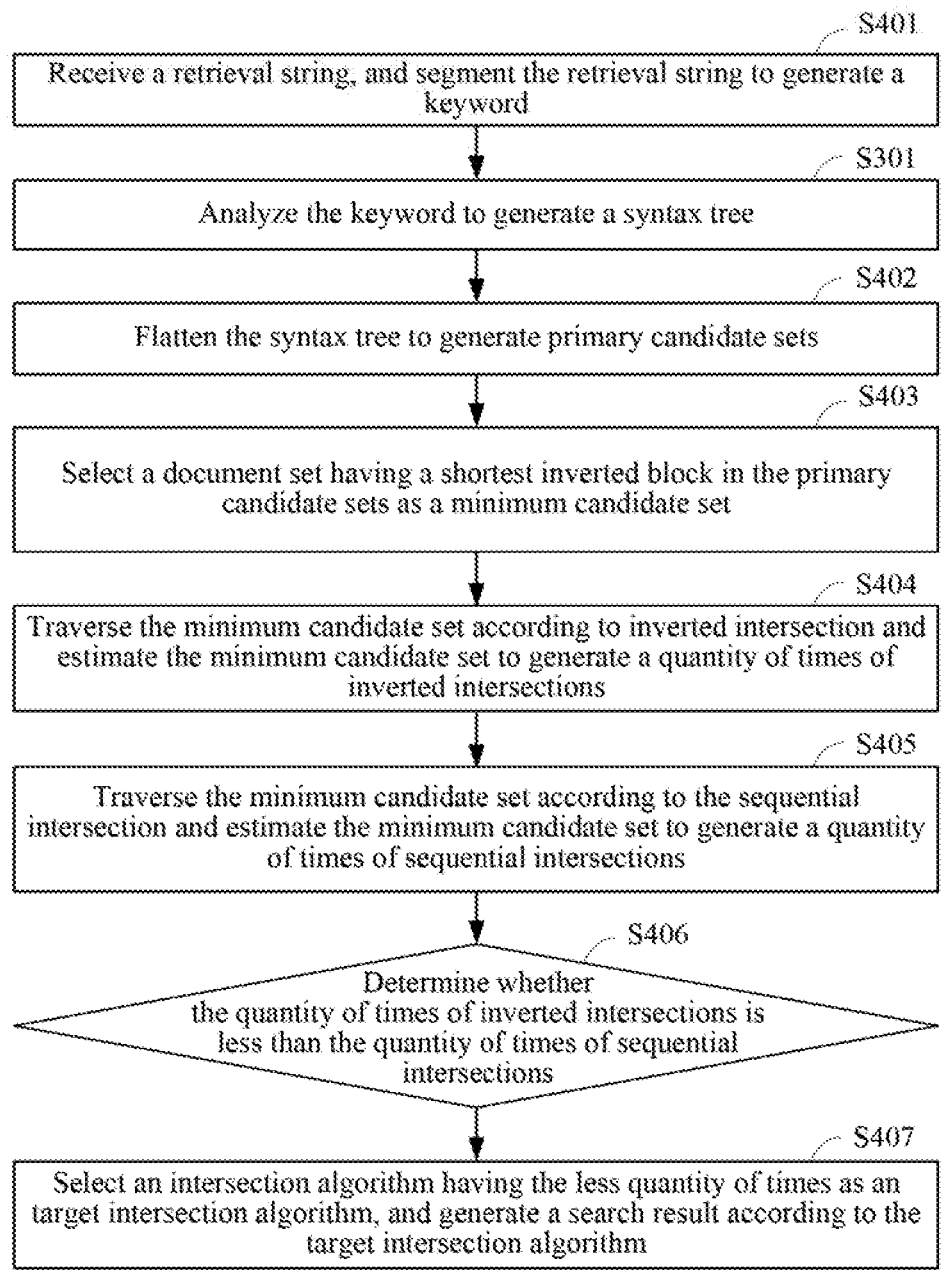
FIG. 4 is a schematic diagram of a work process of an intersection algorithm-based search method according to Embodiment 2 of the present disclosure.

Referring to FIG. 4, FIG. 4 is a schematic diagram of a work process of an intersection algorithm-based search method. This embodiment mainly illustrates optimized steps of the intersection algorithm-based search method. It can be understood that in this figure, the basic steps still start from S30 and the optimized steps start from S40, so that the basis steps and the optimized steps can be better distinguished from each other. An execution sequence of the steps may refer to the following appearance sequence or an arrow sequence in FIG. 4.

In this embodiment, the intersection algorithm-based search method includes:

In step S401, a server receives a retrieval string, and segments the retrieval string to genera a keyword.

The step of generating the keyword specifically includes: (1) presetting a word segmentation rule, the word segmentation rule including at least one of a character string match-based word segmentation method, a word meaning-based word segmentation method, or a statistics-based word segmentation method; and (2) segmenting the retrieval string into several keywords according to the word segmentation rule.

In step S301, the keyword is analyzed to generate a syntax tree.

Figure 5:
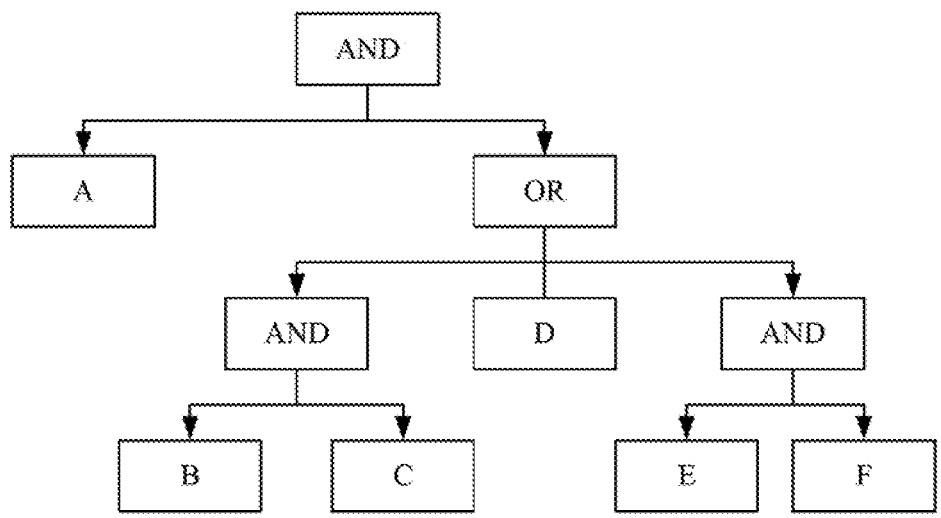
FIG. 5 is a schematic diagram of a syntax tree according to Embodiment 2 of the present disclosure.

FIG. 5 is used as an example, and shows an example of a syntax tree, which is expressed as:

$(A \cap ((B \cap C) \cup (D) \cup (E \cap F)))$, A, B, C, D, E, and F being all keywords.

In step S402, the server flattens the syntax tree to generate primary candidate sets.

Flattening is mainly to simplify multiple layers of syntax relationships in the syntax tree into a two-layer syntax tree connected by means of an intersection set relationship. The syntax tree of FIG. 5 is still used as an example, and $(A \cap ((B \cap C) \cup (D) \cup (E \cap F)))$ is simplified into;

$(A \cap (B \cup D \cup E) \cap (B \cup D \cup F) \cap (C \cup D \cup E) \cap (C \cup D \cup F))$.

In this way, after the syntax tree is simplified into a two-layer syntax tree, results of other combinations do not need to be buffered in an intersection process. In the intersection process, only whether any keyword is hit in all sets of documents needs to be determined.

In step S403, the server selects a document set having a shortest inverted block in the primary candidate sets as a minimum candidate set.

Sorting the primary candidate sets according to lengths of the inverted blocks specifically includes: (1) determining whether the primary candidate set is a composite set, if there is a union set relationship, considering the primary candidate set as a composite set, and if there is no union set relationship, considering the primary candidate set as a non-composite set; (2) if the primary candidate set is a composite set, the length of the inverted block being equal to an accumulative value of a quantity of documents of all keywords of the primary candidate set; or (3) if the primary candidate set is not a composite set, the length of the inverted block being equal to the quantity of documents; and (4) arranging the primary candidate sets according to the lengths of the inverted blocks in ascending order.

It can be understood that selecting a minimum candidate set, that is, selecting a set with a minimum quantity of documents can greatly reduce a quantity of times of comparison, so as to improve a search response speed.

The syntax tree of FIG. 5 is still used as an example, and selection of the minimum candidate set is expressed by formula:

$$\text{Candidate} = \text{MIN}(A, (B,D,E), (B,D,F), (C,D,E), (C,D,F)).$$

In the step S404, the server tranverses the minimum candidate set according to inverted intersection and estimates the minimum candidate set to generate a quantity of times of inverted intersections.

The step of generating the quantity of times of inverted intersections specifically includes: (1) traversing documents in the minimum candidate set; (2) according to a keyword in each set, sequentially searching for an inverted block hitting the keyword; (3) searching, by using a binary search method, in the inverted block for a document hitting the keyword; and (4) after finding the document hitting the keyword, calculating a quantity of times of the document for hitting the keyword to obtain the quantity of times of inverted intersections.

It can be understood that the quantity of times of inverted intersections can be calculated by evaluating a computation complexity using a quantity of keywords, a quantity of inverted blocks, and a quantity of documents in the inverted blocks. That is, some of the above steps may not be completed to obtain the quantity of times as long as values of the variables of the following formula are obtained. The quantity of times of inverted intersections is expressed by a formula:

$$\text{the quantity of times of inverted intersections} = \left( \text{quantity of documents in a candidate set}^* \sum_i \log(X_i \text{ quantity of documents in the inverted blocks}) \right) + \sum_i (X_i \text{ quantity of the inverted blocks}).$$

In step S405, the server traverses the minimum candidate, set according to the sequential intersection and estimates the minimum candidate set to generate a quantity of times of sequential intersections.

The step of generating the quantity of times of sequential intersections specifically includes: (1) establishing an index for documents and keywords in the minimum candidate set, the index including: an inverted document set established for each keyword, and a sequential keyword set established for each document; (2) calculating proximity and full match degrees of the keywords in the documents by using the index; (3) calculating a sorting sequence of the documents according to the proximity match degrees of the keywords; (4) traversing documents in the minimum candidate set according to the sorting sequence; (5) sequentially determining whether the keywords in each set hit the documents in the minimum candidate set; and (6) when the documents in the minimum candidate set are hit, calculating a quantity of times for hitting the documents in the minimum candidate set, that is, the quantity of times of sequential intersections.

It can be understood that the quantity of times of sequential intersections can be calculated by evaluating the computational complexity using a quantity of keywords, a quantity of documents of the minimum candidate set, and an average quantity of keywords in each document. That is, some of the above steps may not be completed to obtain the quantity of times as long as values of the variables of the following formula are obtained. The quantity of times of sequential intersections is expressed by a formula:

$$\text{the quantity of times of sequential intersections} = \sum_i \text{quantity of keywords}^* \log(Doc_i \text{ quantity of words}).$$

In step S406, the server determines whether the quantity of times of inverted intersections is less than the quantity of times of sequential intersections.

In step S407, the server selects an intersection algorithm having the less quantity of times in the quantity of times of inverted intersections and the quantity of times of sequential intersections as a target intersection algorithm, and generates a search result according to the target intersection algorithm.

A search response speed may be effectively improved by evaluating the inverted intersection and the sequential intersection to select a target intersection algorithm used for search.

The intersection algorithm-based search method in the present disclosure is to evaluate inverted intersection and sequential intersection to select a target intersection algorithm used for search, and can achieve small memory occupation, easy extension, and a rapid and in-time search response.

Embodiment 3

Figure 6:
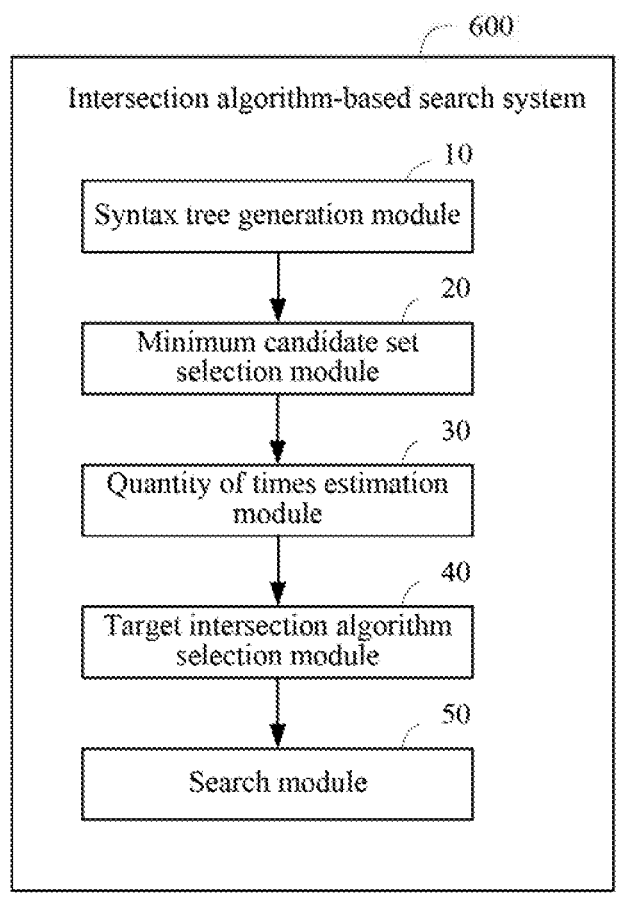
FIG. 6 is a schematic diagram of modules of an intersection algorithm-based search system according to Embodiment 3 of the present disclosure.

Referring to FIG. 6, FIG. 6 is a schematic diagram of modules of an intersection algorithm-based search system. This embodiment mainly illustrates basic modules of the intersection algorithm-based search system 600, including: a syntax tree generation module 10, a minimum candidate set selection module 20, a quantity of times estimation module 30, a target intersection algorithm selection module 40, and a search module 50.

The syntax tree generation module 10 is configured to analyze a search keyword to generate a syntax tree.

The minimum candidate set selection module 20 is configured to flatten the syntax tree and select a document set having a shortest inverted block as a minimum candidate set.

The quantity of times estimation module 30 is configured to traverse the minimum candidate set and evaluate a traversing result so as to separately generate a quantity of times of inverted intersections and a quantity of times of sequential intersections.

The quantity of times of sequential intersections is calculated by using a quantity of keywords, a quantity of documents of the minimum candidate set, and an average quantity of keywords in each document. The quantity of times of inverted intersections is calculated by using a quantity of keywords, a quantity of inverted blocks, and a quantity of documents in the inverted blocks.

The target intersection algorithm selection module 40 is configured to compare the quantity of times of inverted intersections with the quantity of times of sequential intersections and select an intersection algorithm having the less quantity of times as a target intersection algorithm.

The search module 50 is configured to generate a search result according to the target intersection algorithm.

The intersection algorithm-based search system in the present disclosure evaluates inverted intersection and sequential intersection to select a target intersection algorithm used for search, and can achieve small memory occupation, easy extension, and a rapid and in-time search response.

Embodiment 4

Figure 7:
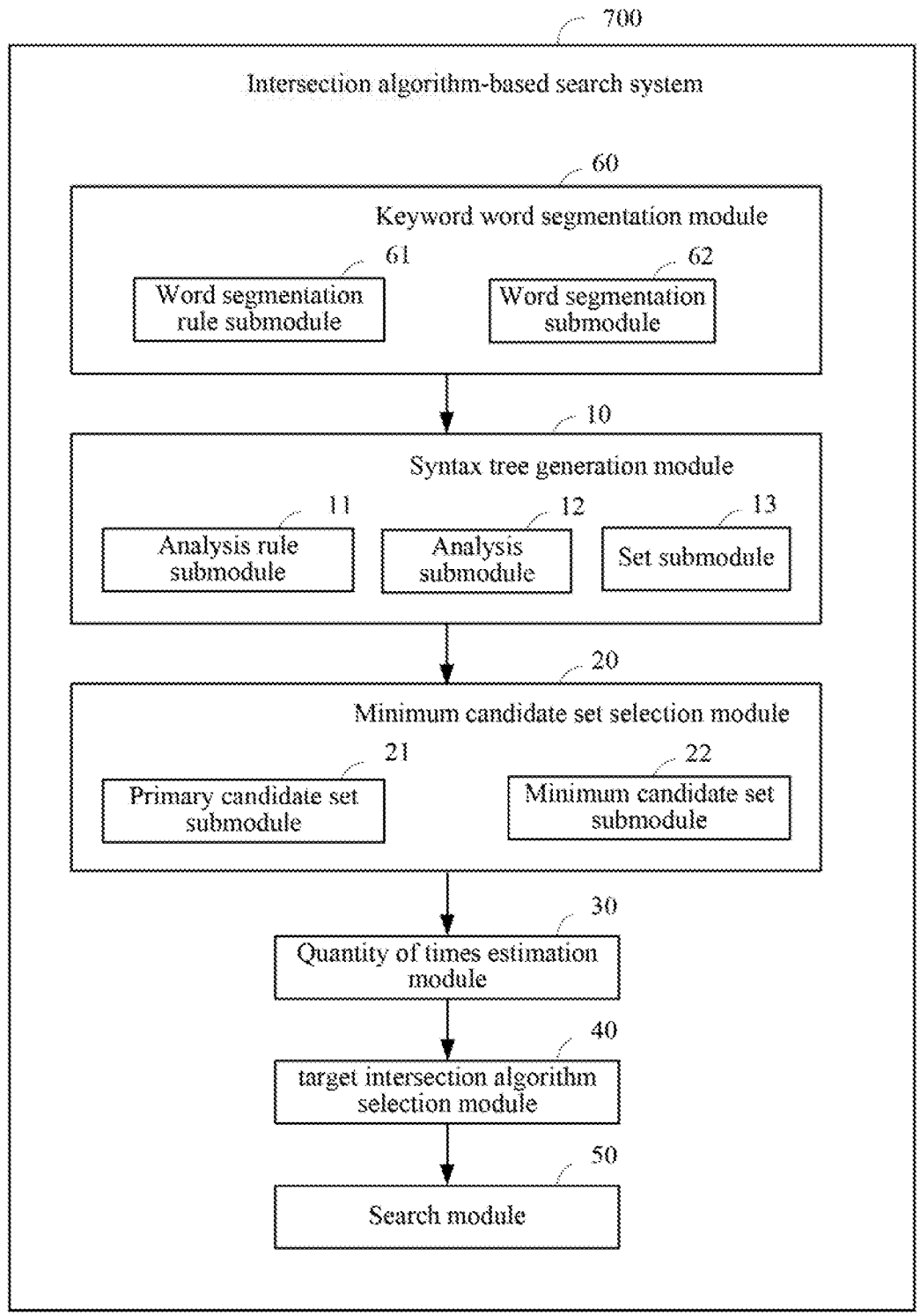
FIG. 7 is a schematic diagram of modules of an intersection algorithm-based search system according to Embodiment 4 of the present disclosure.

Referring to FIG. 7, FIG. 7 is a schematic diagram of modules of an intersection algorithm-based search system. This embodiment mainly illustrates preferred modules of the intersection algorithm-based search system 700, including: a syntax tree generation module 10, a minimum candidate set selection module 20, a quantity of times estimation module 30, a target intersection algorithm selection module 40, a search module 50, and a keyword word, segmentation module 60. Such program modules may be stored in a memory and executed by a processor.

The keyword word segmentation module 60 is configured to receive a retrieval string, and segment the retrieval string to generate a search keyword.

Specifically, the keyword word segmentation module 60 includes a word segmentation rule submodule 61 and a word segmentation submodule 62. The word segmentation rule submodule 61 is configured to preset a word segmentation rule, the word segmentation rule including at least one of a character string match-based word segmentation method, a word meaning-based word segmentation method, or a statistics-based word segmentation method. The word segmentation submodule 62 is configured to segment the retrieval string into several keywords according to the word segmentation rule.

The syntax tree generation module 10 is configured to analyze the search keyword to generate a syntax tree.

Specifically, the syntax tree generation module 10 includes: art analysis rule submodule 11, an analysis submodule 12, and a set submodule 13. The analysis rule submodule 11 is configured to preset an analysis rule, the analysis rule including at least one of word meaning analysis or semantic analysis. The analysis submodule 12 is configured to analyze the search keyword according to the analysis rule. The set submodule 13 is configured to generate a generated keyword set into the syntax tree. The minimum candidate set selection module 20 is configured to flatten the syntax tree and select a document set having a shortest inverted block as a minimum candidate set.

Specifically, the minimum candidate set selection module 20 includes: a primary candidate set submodule 21 and a minimum candidate set submodule 22.

The primary candidate set submodule 21 is configured to flatten the syntax tree to form primary candidate sets. The primary candidate set is a two-layer syntax tree connected by means of an intersection set relationship.

The minimum candidate set submodule 22 is configured to son the primary candidate sets according to lengths of the inverted blocks, and select a document set having a shortest inverted block as a minimum, candidate set. It can be understood that the minimum candidate set is a set with a shortest inverted block, that is, a set with a minimum quantity of documents.

The quantity of times estimation module 30 is configured to traverse the minimum candidate set and evaluate a traversing result so as to separately generate a quantity of times of inverted intersections and a quantity of times of sequential intersections.

The quantity of times of sequential intersections is calculated by using a quantity of keywords, a quantity of documents of the minimum candidate set, and an average quantity of keywords in each document. The quantity of times of inverted intersections is calculated by using a quantity of keywords, a quantity of inverted blocks, and a quantity of documents in the inverted blocks.

The target intersection algorithm selection module 40 is configured to compare the quantity of times of inverted intersections with the quantity of times of sequential intersections and select an intersection algorithm having the less quantity of times as a target intersection algorithm.

When the quantity of times of inverted intersections is equal to the quantity of times of sequential intersections, sequential intersection is selected by default, because the sequential intersection occupies relatively less memory.

The search module 50 is configured to generate a search result according to the target intersection algorithm.

The intersection algorithm-based search system in the present disclosure evaluates inverted intersection and sequential intersection to select a target intersection algorithm used for search, and can achieve small memory occupation, easy extension, and a rapid and in-time search response.

Embodiment 5

Figure 8:
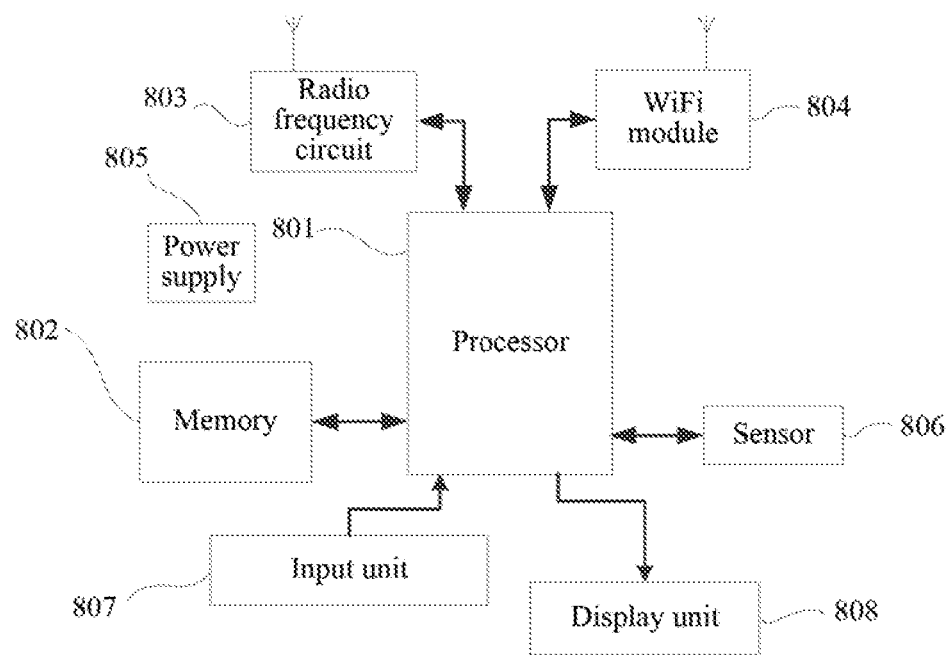
FIG. 8 is a schematic structural diagram of a server according to Embodiment 5 of the present disclosure.

This embodiment of the present disclosure further provides a server, configured to integrate an intersection algorithm-based search system of embodiments of the present disclosure. As shown in FIG. 8, FIG. 8 is a schematic structural diagram of a server involved in this embodiment of the present disclosure, specifically:

The server may include components such as a processor 801 including one or more processing cores, a memory 802 including one or more computer readable storage media, a radio frequency (RF) circuit 803, a WiFi module 804, a power supply 805, a sensor 806, an input unit 807, and a display unit 808. A person skilled in the art may understand that a structure of the server shown in FIG. 8 does not define the server. The server may include more or less components than those in FIG. 8, or combine some components, or have different component arrangements.

Specifically in this embodiment, the processor 801 in the server may load executable files corresponding to processes of one or more applications to the memory 802, and the processor 801 operates applications stored in the memory 802, so as to implement various functions, and the various functions are as follows: analyzing a search keyword to generate a syntax tree; flattening the syntax tree and selecting a document set having a shortest inverted block as a minimum candidate set; traversing the minimum candidate set and evaluating a traversing result so as to separately generate a quantity of times of inverted intersections and a quantity of tunes of sequential intersections; comparing the quantity of times of inverted intersections with the quantity of times of sequential intersections and selecting an intersection algorithm having the less quantity of times as a target intersection algorithm; and generating a search result according to the target intersection algorithm.

The intersection algorithm-based search method and system, and a storage medium provided in the embodiments of the present disclosure belong to a same concept. Refer to full text of the description for details of a specific process for implementing the intersection algorithm-based search method and system, and the storage medium, and the details are not described herein again.

To sum up, although the present disclosure has been disclosed above through the preferred embodiments, the preferred embodiments are not intended to limit the present disclosure, and a tester of ordinary skill in the art can make various variations and modifications without departing from the spirit and scope of the present disclosure; therefore, the protection scope of the present disclosure should be subject to the scope defined by the claims.

What is claimed is:

1. An intersection algorithm-based search method, comprising:
   analyzing search keywords to generate a syntax tree;
   flattening the syntax tree;
   selecting a document set having a shortest inverted block as a minimum candidate set;

traversing the minimum candidate set and evaluating a traversing result to generate a quantity of times of inverted intersections and a quantity of times of sequential intersections respectively;

comparing the quantity of times of inverted intersections with the quantity of times of sequential intersections;

selecting an intersection algorithm having the less quantity of times as a target intersection algorithm, wherein the intersection algorithm is selected from a first algorithm corresponding to the inverted intersections and a second algorithm corresponding to the sequential intersections; and generating a search result according to the target intersection algorithm.

2. The search method according to claim 1, wherein the flattening the syntax tree and selecting a document set having a shortest inverted block as a minimum candidate set further comprises:

flattening the syntax tree to form primary candidate sets;
sorting the primary candidate sets according to lengths of the inverted blocks; and
selecting the document set having a shortest length of inverted block as the minimum candidate set.

3. The search method according to claim 2, wherein the flattening the syntax tree to form primary candidate sets further comprises:

determining whether the syntax tree comprises a union set relationship; and
if there is the union set relationship, performing combination processing,
wherein the primary candidate sets are formed until multiple layers of syntax relationships in the syntax tree are simplified into a two-layer syntax tree connected by one or more intersection set relationship.

4. The search method according to claim 2, wherein the sorting the primary candidate sets according to lengths of the inverted blocks further comprises:

determining whether one of the primary candidate sets is a composite set;
if the primary candidate set is a composite set, the length of the inverted block associated with the primary candidate set being equal to an accumulative value of a quantity of documents of all keywords related to the primary candidate set; or if the primary candidate set is not a composite set, the length of the inverted block associated with the primary candidate set being equal to the quantity of documents; and
arranging the primary candidate sets according to the lengths of the inverted blocks in ascending order.

5. The search method according to claim 1, wherein in the step of traversing the minimum candidate set and evaluating a traversing result to generate a quantity of times of inverted intersections and a quantity of times of sequential intersections, the generating a quantity of times of inverted intersections respectively further comprises:

traversing documents in the minimum candidate set;
according to a keyword in each set, sequentially searching for an inverted block hitting the keyword;
searching, by using a binary search method, in the inverted block for a document hitting the keyword; and
after finding the document hitting the keyword, calculating a quantity of times of the document for hitting the keyword to obtain the quantity of times of inverted intersections.

6. The search method according to claim 1, wherein the quantity of times of inverted intersections is calculated by using a quantity of keywords, a quantity of inverted blocks, and a quantity of documents in the inverted blocks.

7. The search method according to claim 1, wherein the traversing the minimum candidate set and evaluating a traversing result to generate a quantity of times of inverted intersections and a quantity of times of sequential intersections, the generating a quantity of times of inverted intersections respectively further comprises:

establishing an index for documents and keywords in the minimum candidate set, the index comprising: an inverted document set established for each keyword, and a sequential keyword set established for each document;
calculating proximity and full match degrees of the keywords in the documents by using the index;
calculating a sorting sequence of the documents according to the proximity and full match degrees of the keywords;
traversing documents in the minimum candidate set according to the sorting sequence;
sequentially determining whether the keywords in each set hit the documents in the minimum candidate set; and
when the documents in the minimum candidate set are hit, calculating a quantity of times for hitting the documents in the minimum candidate set to obtain the quantity of times of inverted intersections.

8. The search method according to claim 1, wherein the quantity of times of sequential intersections is calculated by using the quantity of keywords, a quantity of documents of the minimum candidate set, and an average quantity of keywords in each document.

9. The search method according to claim 1, wherein the comparing the quantity of times of inverted intersections with the quantity of times of sequential intersections and selecting an intersection algorithm having the less quantity of times as a target intersection algorithm further comprises:

comparing the quantity of times of inverted intersections with the quantity of times of sequential intersections;
if the quantity of times of inverted intersections is less than the quantity of times of sequential intersections, selecting the quantity of times of inverted intersections as the target intersection algorithm; and
if the quantity of times of inverted intersections is greater than or equal to the quantity of times of sequential intersections, selecting the quantity of times of sequential intersections as the target intersection algorithm.

10. The search method according to claim 1, wherein the analyzing a search keyword to generate a syntax tree further comprises:

presetting an analysis rule, the analysis rule comprising at least one of word meaning analysis or semantic analysis;
analyzing the search keyword according to the analysis rule; and
generating a keyword set generated by analysis into a syntax tree.

11. The search method according to claim 1, before the analyzing a search keyword to generate a syntax tree, the method further comprises the following step:

receiving a retrieval string, and segmenting the retrieval string to generate the search keyword.

12. The search method according to claim 11, wherein the receiving a retrieval string, and segmenting the retrieval string to generate the search keyword further comprises:

presetting a word segmentation rule, wherein the segmenting the retrieval string to generate the search keyword is further: segmenting the retrieval string into several search keywords according to the word segmentation rule.

13. An intersection algorithm-based search system, comprising: a memory; and a processor coupled to the memory, the processor being positioned to perform:

analyzing search keywords to generate a syntax tree;

flattening the syntax tree and selecting a document set having a shortest inverted block as a minimum candidate set;

traversing the minimum candidate set and evaluating a traversing result to generate a quantity of times of inverted intersections and a quantity of times of sequential intersections respectively;

comparing the quantity of times of inverted intersections with the quantity of times of sequential intersections and selecting an intersection algorithm having the less quantity of times as a target intersection algorithm, wherein the intersection algorithm is selected from a first algorithm corresponding to the inverted intersections and a second algorithm corresponding to the sequential intersections; and generating a search result according to the target intersection algorithm.

14. The search system according to claim 13, wherein the processor is positioned to further perform:

receiving a retrieval string, and segmenting the retrieval string to generate the search keywords.

15. The search system according to claim 13, wherein the flattening the syntax tree and selecting the document set having the shortest inverted block as the minimum candidate set further comprises:

flattening the syntax tree to form primary candidate sets, the primary candidate set being a two-layer syntax tree connected by one or more intersection set relationship; and sorting the primary candidate sets according to lengths of the inverted blocks, and selecting the document set having the shortest inverted block as the minimum candidate set.

16. The search system according to claim 13, wherein:

the quantity of times of sequential intersections is calculated by using a quantity of keywords, a quantity of documents of the minimum candidate set, and an average quantity of keywords in each document; and the quantity of times of inverted intersections is calculated by using a quantity of keywords, a quantity of inverted blocks, and a quantity of documents in the inverted blocks.

17. A non-transitory storage medium, storing a processor executable instruction therein, the processor executable instruction being positioned to enable a processor to complete the following operations:

analyzing keywords to generate a syntax tree;

flattening the syntax tree;

selecting a document set having a shortest inverted block as a minimum candidate set;

traversing the minimum candidate set and evaluating a traversing result to generate a quantity of times of inverted intersections and a quantity of times of sequential intersections respectively;

comparing the quantity of times of inverted intersections with the quantity of times of sequential intersections;

selecting an intersection algorithm having the less quantity of times as a target intersection algorithm, wherein the intersection algorithm is selected from a first algorithm corresponding to the inverted intersections and a second algorithm corresponding to the sequential intersections; and generating a search result according to the target intersection algorithm.

18. The non-transitory storage medium according to claim 17, wherein the flattening the syntax tree and selecting a document set having a shortest inverted block as a minimum candidate set further comprises:

flattening the syntax tree to form primary candidate sets;

sorting the primary candidate sets according to lengths of the inverted blocks; and selecting the document set having a shortest length of inverted block as the minimum candidate set.

19. The non-transitory storage medium according to claim 17, wherein the flattening the syntax tree to form primary candidate sets further comprises:

determining whether the syntax tree comprises a union set relationship; and if there is the union set relationship, performing combination processing, wherein the primary candidate sets are formed until multiple layers of syntax relationships in the syntax tree are simplified into a two-layer syntax tree connected by one or more intersection set relationship.

20. The non-transitory storage medium according to claim 17, wherein:

the quantity of times of sequential intersections is calculated by using a quantity of keywords, a quantity of documents of the minimum candidate set, and an average quantity of keywords in each document; and the quantity of times of inverted intersections is calculated by using a quantity of keywords, a quantity of inverted blocks, and a quantity of documents in the inverted blocks.

* * * * *